(12) United States Patent
Mannan

(10) Patent No.: US 10,547,121 B2
(45) Date of Patent: Jan. 28, 2020

(54) LOW PROFILE ANTENNA WITH HIGH GAIN

(71) Applicant: Michael Mannan, Harrow (GB)

(72) Inventor: Michael Mannan, Harrow (GB)

( * ) Notice: Subject to any disclaimer, the term of this patent is extended or adjusted under 35 U.S.C. 154(b) by 93 days.

(21) Appl. No.: 15/775,087

(22) PCT Filed: Nov. 22, 2016

(86) PCT No.: PCT/GB2016/053632
§ 371 (c)(1),
(2) Date: May 10, 2018

(87) PCT Pub. No.: WO2017/089753
PCT Pub. Date: Jun. 1, 2017

(65) Prior Publication Data
US 2018/0375216 A1    Dec. 27, 2018

(30) Foreign Application Priority Data

Nov. 23, 2015 (GB) .................................. 1520640.2

(51) Int. Cl.
| | | |
|---|---|---|
| *H01Q 1/48* | (2006.01) | |
| *H01Q 21/06* | (2006.01) | |
| *H01Q 1/24* | (2006.01) | |
| *H01Q 9/04* | (2006.01) | |
| *H04M 1/02* | (2006.01) | |

(52) U.S. Cl.
CPC ........... *H01Q 21/061* (2013.01); *H01Q 1/243* (2013.01); *H01Q 1/48* (2013.01); *H01Q 9/045* (2013.01); *H04M 1/0266* (2013.01)

(58) Field of Classification Search
CPC ............ H01Q 21/06; H01Q 1/24; H01Q 1/48; H01Q 9/04
USPC .......................................................... 343/702
See application file for complete search history.

(56) References Cited

U.S. PATENT DOCUMENTS

| | | | |
|---|---|---|---|
| 6,057,802 A | 5/2000 | Nealy | |
| 2002/0171588 A1* | 11/2002 | Fang ..................... | G06F 1/1601 343/700 MS |
| 2003/0210207 A1 | 11/2003 | Suh | |
| 2005/0235482 A1 | 10/2005 | Deaett et al. | |
| 2012/0176289 A1* | 7/2012 | Lee ........................ | H01Q 9/285 343/818 |

FOREIGN PATENT DOCUMENTS

| | | |
|---|---|---|
| EP | 0720252 A1 | 7/1996 |
| EP | 1768211 A1 | 3/2007 |
| GB | 2384368 A | 7/2003 |
| GB | 2392563 A | 3/2004 |
| GB | 2505495 A | 3/2014 |
| WO | 96 02074 A1 | 1/1996 |
| WO | 97 38463 A1 | 10/1997 |
| WO | 01 59881 A1 | 8/2001 |

* cited by examiner

*Primary Examiner* — Andrea Lindgren Baltzell
(74) *Attorney, Agent, or Firm* — Craft Chu PLLC; Andrew W. Chu

(57) ABSTRACT

An antenna includes at least one first pair of electrically conducting lands and a second pair of spaced-apart electrically conducting lands or a single land. The first pair is spaced apart from the second pair or single land, either parallel or tilted with respect to a ground plane.

20 Claims, 5 Drawing Sheets

LOW PROFILE ANTENNA WITH HIGH GAIN

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to antennae. In one form it relates to an antenna which is particularly suited for, but not limited to integration in an electronic device. The antenna can be used to increase the signal strength of radio signals used in the operation of the electronic device.

2. Description of Related Art Including Information Disclosed Under 37 CFR 1.97 and 37 CFR 1.98

In recent years, the growth in consumer electronics has been significant. Such consumer electronics includes, but is not limited to televisions, monitors, mobile telephones, smartphones, tablet computers, laptops, personal computers, portable games consoles smartwatches and smart devices. As these devices become more prevalent in everyday life, there is a need for these devices to be capable of radio reception, be it for connection to the internet, another device, or merely to receive information. This need coupled with the trend to miniaturize these devices, be it for aesthetic and/or portability reasons, means that a wireless connection is the only viable option.

The conventional approach with most of these devices is to miniaturize the relevant receiving/transmitting antennae. The antennae are miniaturised to the extent possible whilst still enabling acceptable performance. However, what would pass as acceptable performance in ideal conditions can rapidly degenerate into unacceptable performance in real world use. For example, intermediate objects, neighbouring devices, signals, and antennae can mean that the strength of the received signal is poor at best, and the low performance of the antenna does little to improve the situation. This can result in dropped packets when the antenna is used for connection to the internet. In low bandwidth applications, this may not be noticed, but with the emergence of high-bandwidth applications (e.g. 720p, 1080p, Ultra HD television, game streaming services etc.), a reliable, stable connection is necessary.

Furthermore, many consumer electronic devices are also capable of receiving data packets in at least two separate frequencies (i.e. bands). Ideally, this is accomplished by a single antenna that is capable of receiving all bands. Further each band must have comparable performance, since it cannot be guaranteed that a particular band is available (i.e. a transmitting device, such as a router may not be compliant with the latest iteration of IEEE 802.11, and only offer 802.11 b and g at 2.4 GHz, and not a preferred 802.11 n at 5 GHz.)

Hence, there is a need for an antenna that has high gain, low directional preference, but is low profile so that it can be used in a variety of electronic devices.

BRIEF SUMMARY OF THE INVENTION

According to the invention there is provided an antenna as defined in claim 1. The antenna comprising a pair of electrically conducting lands disposed in a first plane, antenna feed means for each land of the at least one pair of electrically conducting lands, the pair of lands being symmetric about, and spaced-apart from an imaginary line on the first plane, a second pair of spaced-apart electrically conducting lands or a single land, disposed in said plane, said second pair of lands or said single land being spaced-apart from the first pair of lands along said imaginary line, being electrically-insulated from the first pair of lands, and being symmetric about said imaginary line, and a ground plane oriented in a substantially parallel plane, wherein the ground plane is spaced apart from the lands by a value from about $\frac{1}{24}\lambda$ to $\frac{1}{6}\lambda$, or a ground plane oriented in a plane that is angled with respect to the first plane and spaced apart therefrom, wherein the ground plane is spaced apart from the lands by about $\frac{1}{6}\lambda$ or $\frac{1}{24}\lambda$ at one end and about $\frac{1}{12}\lambda$ at the opposite end, wherein $\lambda$ is the wavelength of a frequency of operation of the antenna. The antenna is low profile, has high gain, and low directional preference. The range of spacings which may be used, and the flexibility to tilt the lands with respect to a ground plane results in an antenna with good performance (i.e. a high gain) whilst retaining flexibility of the antenna design in relation to an electronic device in which it may be disposed. Further features of the invention are set forth in the dependent claims.

When the ground plane is oriented in a substantially parallel plane, the ground plane may be spaced apart from the lands by about $\frac{1}{12}\lambda$, $\frac{1}{24}\lambda$ or $\frac{1}{6}\lambda$. Using any of these spacings results in an antenna with minimal trade-off between performance and design flexibility in relation to an electronic device in which the antenna may be disposed.

The antenna may be configured for a dual-band operation comprising a first frequency of operation, and a second frequency of operation, wherein the second frequency of operation is about twice the first frequency of operation. The antenna has a good impedance match at both the first and second frequencies of operation.

Each land of the first and second pairs of electrically conducting lands may be of the same size, and/or each land of the first and second pairs of electrically conducting lands is of a size and a spacing with respect to the other lands so as to permit resonance at the first and second frequencies of operation. This further improves the impedance match at the first and second frequencies of operation.

The ground plane may be spaced apart from the lands by an insulator. This allows "tuning" of the antenna's characteristics, including performance.

The antenna may further comprise at least one third electrically conducting single land or pair of lands disposed in a second plane and electrically insulated from the first and second pairs of electrically conducting lands, the third electrically conducting single land or pair of lands being symmetric about the imaginary line. This permits a boost in the antenna's gain.

When referring to planes, a first plane differs from a second plane through orientation of the first plane with respect to the second plane. A plane offset vertically or horizontally from and parallel to a plane is considered to be the same plane as the plane from which it is offset.

The first and second planes may be substantially orthogonal. This optimises a boost in the antenna's gain.

The antenna may further comprise at least one fourth electrically conducting land or pair of lands in the second plane, the at least one fourth land or pair of lands being spaced apart from the at least one third electrically conducting land or pair of lands, and being electrically insulated from the at least one third electrically conducting land or pair of lands and being symmetric about the imaginary line. This can further boost the antenna's gain.

Each land is generally rectangular or trapezoidal. The shape can be used to tune the antenna's operational characteristics.

The ground plane may comprise an electrically conducting panel. This maximises the gain provided by the antenna.

The panel may be a cover of an LCD, LED, OLED, AMOLED, plasma, or the like, display panel. This provides an effective ground plane for use in conjunction with the antenna.

The display panel may be mounted within an electronic device and the first and second lands are mounted on a housing of the electronic device. This permits maximum flexibility in locating the lands with respect to the ground plane provided by the display panel.

The first and second lands may be mounted inside or outside the housing, or embedded therein. This allows the antenna to be integrated easily into an existing consumer electronic device without increasing the device's size.

The ground plane is connected to a ground of an electronic system of the electrical device to optimise the effectiveness of the display panel as a ground plane.

The at least one third electrically conductive land or third pair of lands may be disposed on a wall mount of the electronic device or within a stand of the electronic device, and/or the at least one fourth electrically conductive land or fourth pair of lands may be disposed on a wall mount of the electronic device or within a stand of the electronic device. This allows the antenna to be integrated easily into an existing consumer electronic device, and its supporting structures without increasing the overall size of the device and its supporting structures.

The antenna in principle may be used with any electronic device such as a television, a monitor, a mobile telephone, a smartphone, a tablet computer, a laptop, a personal computer, a portable games consoles, a smartwatch, a set top box, a smart printer and a smart device.

An antenna system may be formed using two antennas, wherein the ground plane is common to both antennas. This allows MIMO implementations to be used.

DETAILED DESCRIPTION OF THE INVENTION

A preferred antenna according to the invention, for use with an electronic device, will now be described by way of example with reference to the accompanying drawings.

Figure 1:
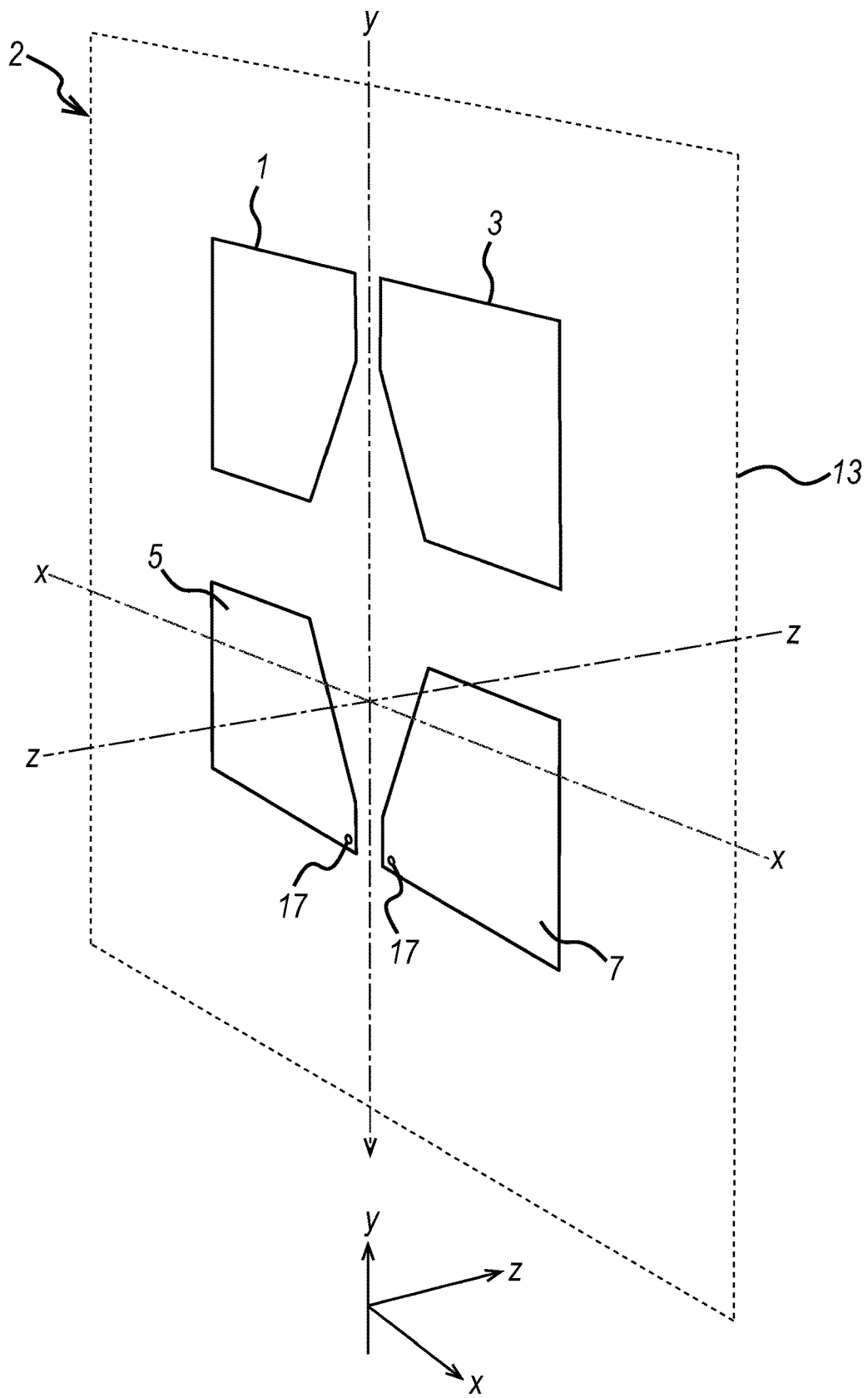
FIG. 1 shows a schematic view of an array which is used in conjunction with a ground plane to form an antenna.

As shown in FIG. 1, the antenna 2 comprises four spaced lands 1, 3, 5 and 7 in the XY plane (i.e. a first plane). Lands 1, 3, 5 and 7 as shown may have a fully or partially tapered edge from the y side to the x side (i.e. at edge which is at an angle to both x-x and y-y directions). The lands 1, 3, 5 and 7 may be aluminium foil 1, 3, 5 and 7. The aluminium foil is approximately $200 \times 10^{-10}$ metres in thickness, which gives an electrical resistance of about 1.5 ohms per square. The lands may be supported by a sheet 9 of stiff cardboard (to which the lands have been laminated by hot foil blocking). The foil may be overcoated with an electrically-insulating lacquer. The arrangement may be manufactured by sputtering aluminium to the desired thickness onto a lacquer-coated backing surface. The aluminium is then coated with adhesive and the combination hot foil blocked onto the sheet 9 with the adhesive adjacent the sheet. The backing surface is peeled away to leave the sheet 9, lands 1, 3, 5 and 7 and lacquer overcoating bonded together.

Alternatively, as opposed to using a sheet 9, the lands may be supported by a device in which the antenna 2 is used.

Feeds 17 are taken from lands 1, 5 for obtaining a signal at a desired frequency.

Each pair of lands 1, 3 and 5, 7 respectively is spaced apart from and is symmetrical about an imaginary line y-y on the XY plane.

Figure 2:
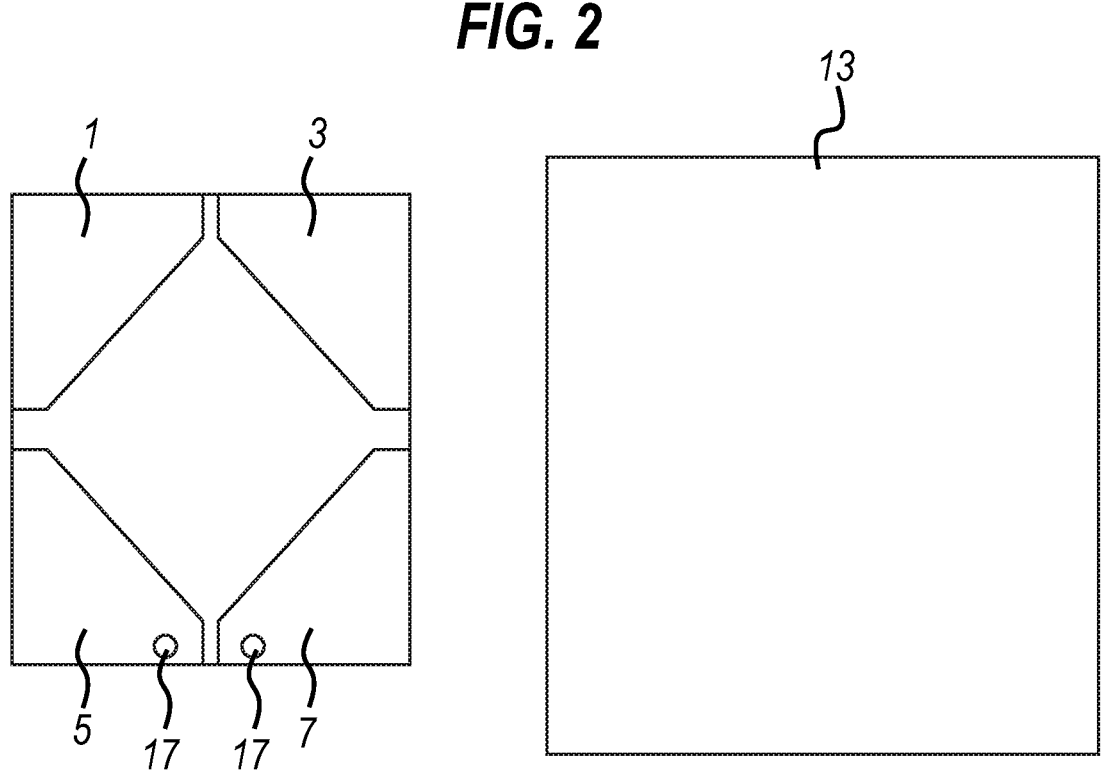
FIG. 2 show XY and YZ elevation views of the antenna of FIG. 1.
Figure 2:
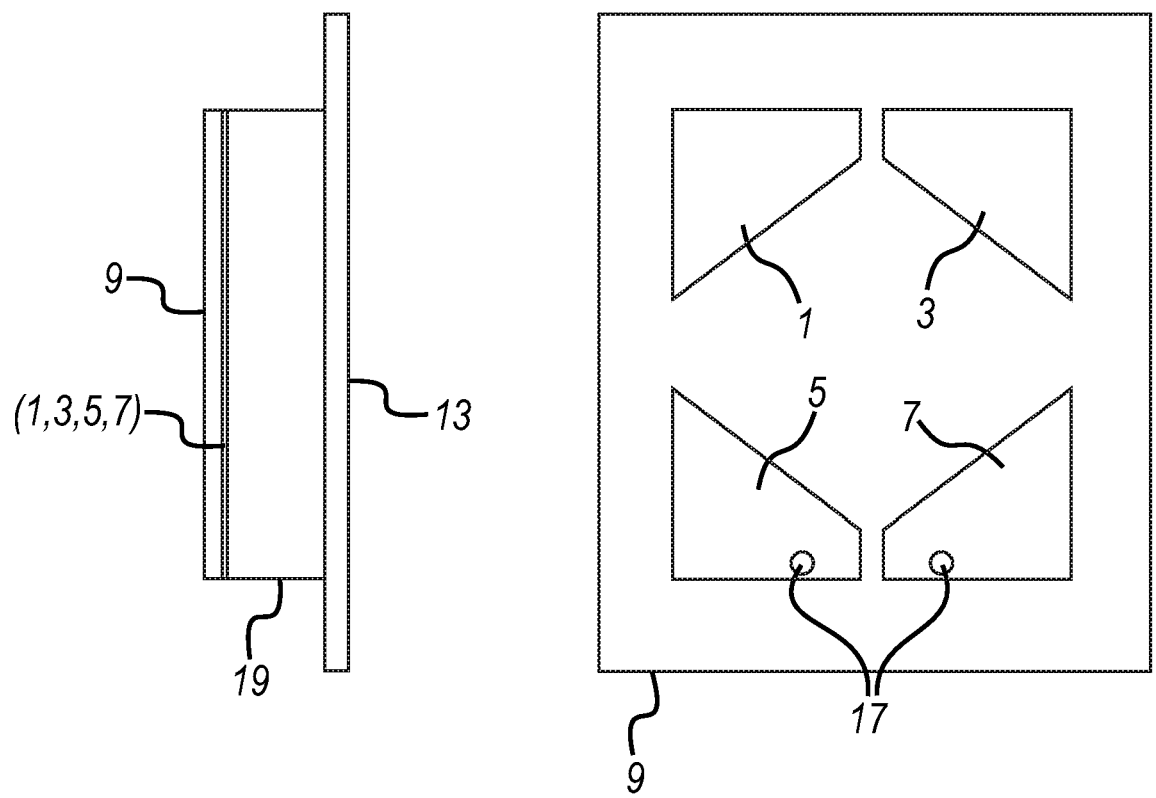

The antenna also comprises an electrically conductive sheet of material 13. The electrically conductive sheet of material 13 acts as a ground plane for the antenna. In one aspect, as shown in FIG. 2, the ground plane is in the same plane as the lands 1, 3, 5 and 7 (i.e. the first plane), but spaced apart from the lands 1, 3, 5 and 7 (i.e. the lands 1, 3, 5 and 7 are parallel to the ground plane 13). In this aspect, the spacing can be a value from about $\frac{1}{24}\lambda$ to $\frac{1}{6}\lambda$, wherein $\lambda$ is the wavelength of the frequency of operation of the antenna. The spacing may comprise an insulator 19 to tune the frequency of operation, or other antenna characteristics.

It will be appreciated that the size of the lands can be varied according to the frequency of operation. For example, the configuration of the tapered edge can be varied to optimise performance. Other configurations include substantially square or trapezoidal.

For example, in a first variation of a 2.4 GHz implementation, lands 1, 3, 5 and 7 each have a maximum y-dimension of about 3.875 cm and a maximum x-dimension of about 3.75 cm. The maximum separation between the lands in the y-y direction is about 1.25 cm to give an overall y-dimension of about 9 cm. The maximum separation between the lands in the x-x direction is about 0.5 cm to give an overall x-dimension of about 8 cm. In this case, the spacing between the ground plane and the lands 3, 5, 7, and 9 would correspond to about 1.04 cm (~1/12λ at 2.4 GHz).

Figure 3:
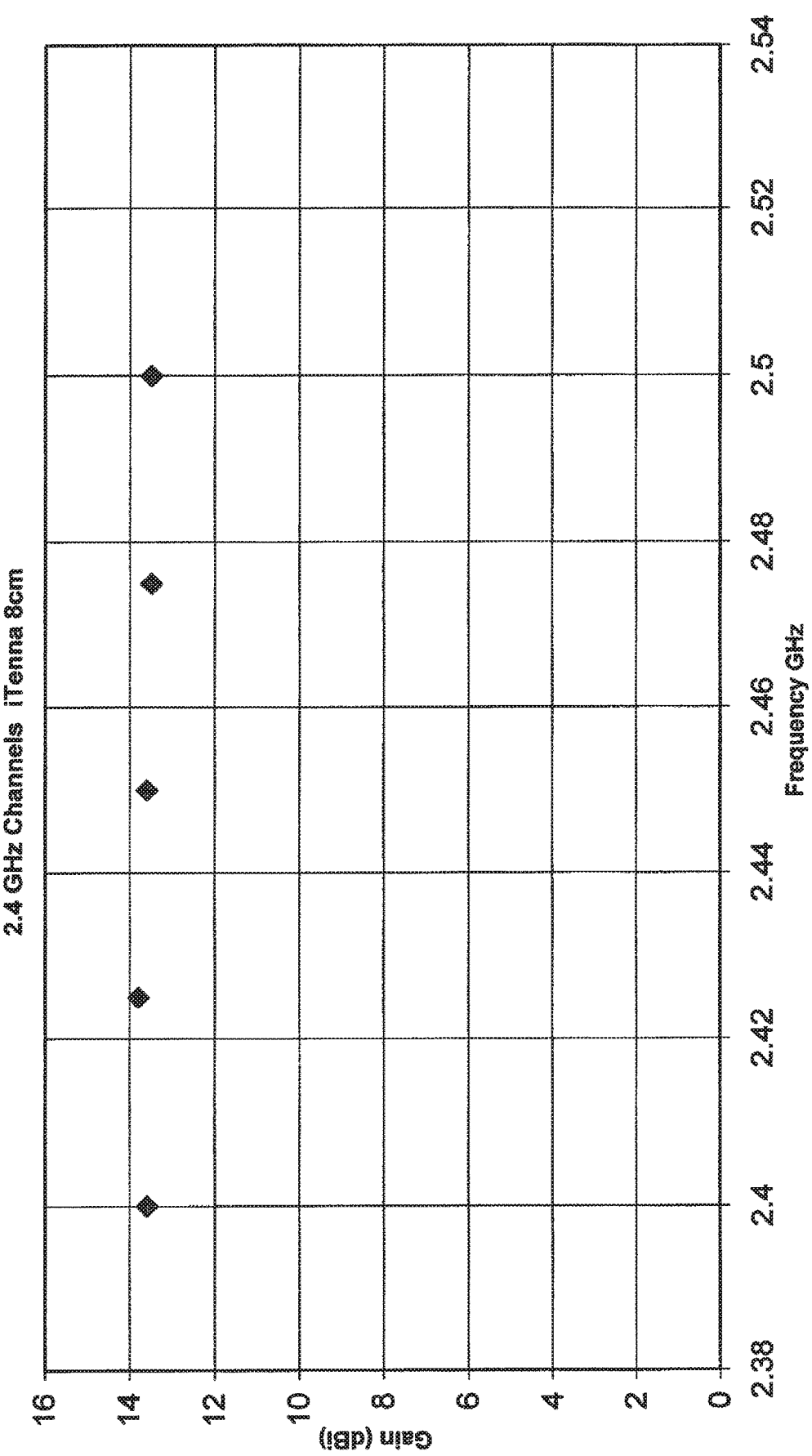
FIG. 3 shows a graph illustration of the gain of the antenna of FIG. 1 at 2.4 GHz.

With this arrangement, as shown in FIG. 3, the antenna has a very high gain of ~14 dB. It has also been observed that the antenna has low directional preference.

In a second variation of a 2.4 GHz implementation, the above specified dimensions in respect of the lands of the first variation of a 2.4 GHz implementation can be maintained, and the spacing between the ground plane and the lands 1, 3, 5 and 7 can be reduced to about 0.5 cm (~1/24λ at 2.4 GHz). Alternatively, in a third variation of a 2.4 GHz implementation the above specified dimensions in respect of the lands of the first variation of a 2.4 GHz implementation can be scaled according to the reduction in the spacing between the ground plane and the lands 1, 3, 5 and 7. In either case, the antenna still has a high gain of ~13 dB.

Similarly, in a fourth variation of a 2.4 GHz implementation, lands 1, 3, 5 and 7 can each have a maximum y-dimension of about 4 cm and a maximum x-dimension of about 4 cm. The maximum separation between the lands in the y-y direction is about 2 cm to give an overall y-dimension of about 10 cm. The maximum separation between the lands in the x-x direction is about 0.5 cm to give an overall x-dimension of about 8.5 cm. In this case, the spacing between the ground plane and the lands 3, 5, 7, and 9 is about 2.13 cm (~1/6λ at 2.4 GHz). The antenna with this fourth configuration still has a high gain of ~12 dB.

The above first, second third and fourth variations all demonstrate that either or both of the spacing between the ground plane and the lands 1, 3, 5 and 7, and the shape/size of the lands 1, 3, 5 and 7 themselves can be varied, without adversely affecting the performance of the antenna 2. Hence, the spacing of lands an appropriate distance from a ground plane allows a low profile, high gain antenna, with low directional preference to be implemented.

For all of the above first, second, third and fourth variations, the spacing between the ground plane and the lands 1, 3, 5 and 7 is with respect to the wavelength of a frequency of operation at 2.4 GHz. In principle, the antenna can be designed for any frequency of operation (i.e. varying the spacing between the ground plane and the lands as a function of frequency and thus wavelength). As mentioned, varying the dimensions of the lands and the spacing thereof is also contemplated.

Figure 4:
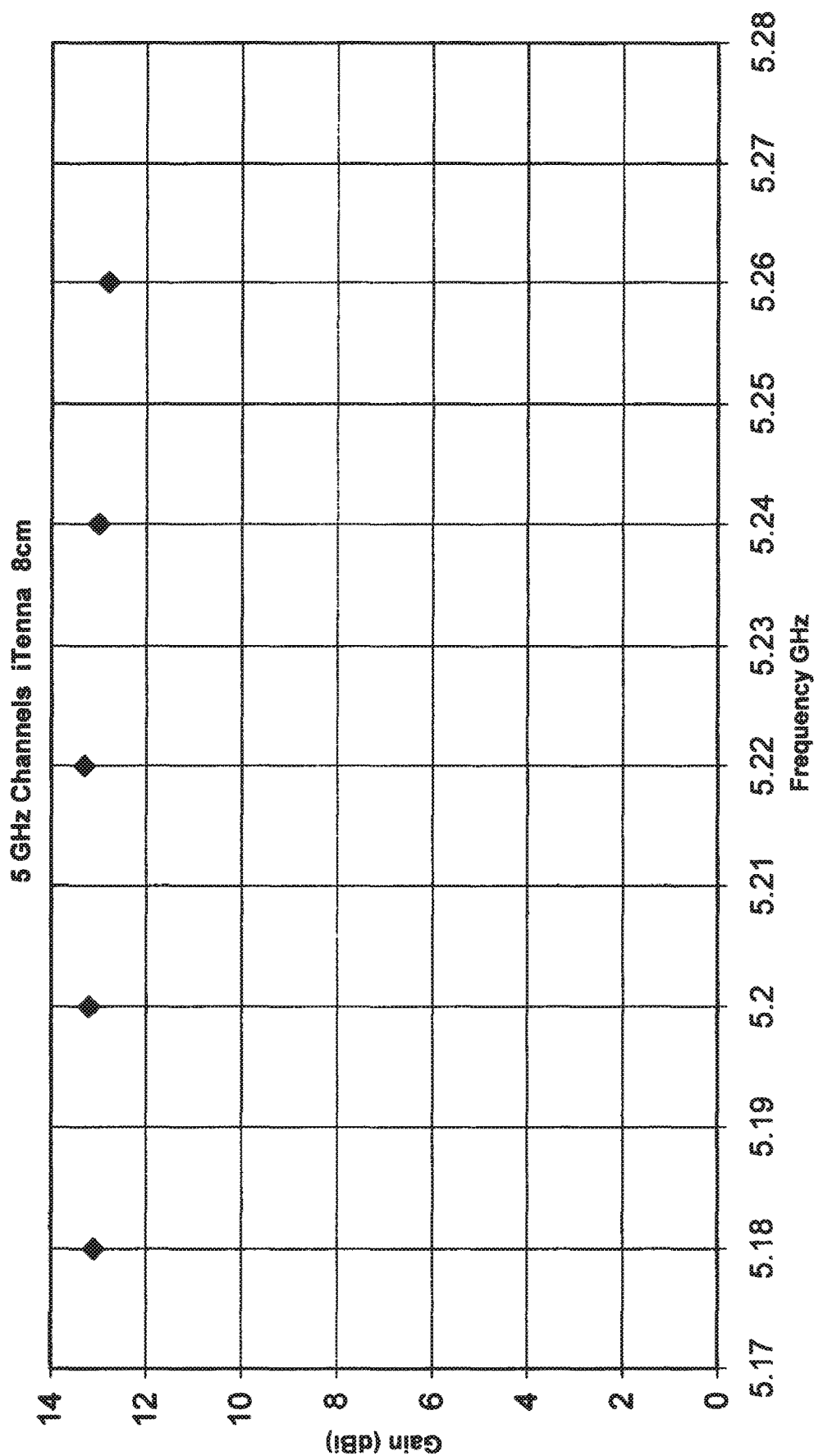
FIG. 4 shows a graph illustration of the gain of the antenna of FIG. 1 at 5 GHz.

For the above first variation, to which the results in FIG. 3 relate, the overall x-dimension of about 8 cm corresponds to ~2/3λ at 2.4 GHz which is also 4/3λ at 5 GHz (similarly, the spacing between the ground plane and the lands is ~1/12λ at 2.4 GHz, and ~1/6λ at 5 GHz). When the lands are configured in such a manner, the antenna has an excellent impedance match at both 2.4 GHz and 5.2 GHz. As shown in FIG. 4, there is a very high gain of ~14 dB at 5.2 GHz. It has also been found that the antenna 2 also has low directional preference at 5.2 GHz. Accordingly, a dual-band antenna with high gain has been realised.

A similar result in respect of the fourth variation has been observed where the gain is ~13 dB at 5.2 GHz.

Hence, varying the dimensions of the lands and the spacing thereof, and the spacing between the ground plane and the lands as a function of frequency (and thus wavelength) can permit the antenna to resonate at any first and second frequencies of operation, wherein the second frequency is about double the first frequency.

Figure 5:
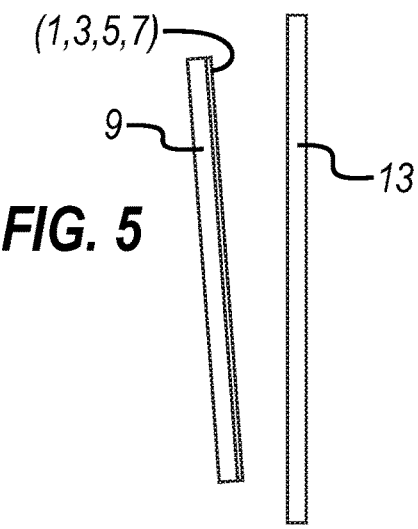
FIG. 5 shows a schematic view of an alternative antenna to that of FIG. 2.

In an alternative aspect of all of the above first, second, third and fourth variations, as shown in FIG. 5, the ground plane is oriented in a plane that is angled with respect to the plane of the lands 1, 3, 5 and 7 (i.e. the first plane) and spaced apart therefrom. The sheet is spaced from the lands by 1/6λ or 1/24λ at one end and about at the opposite end. With this configuration, performance with respect to any of the configurations outlined above, is not notably diminished, e.g. −1 dB. This configuration is useful when there are constraints imposed by the device in which the antenna may be used. Such constraints can be accommodated without adversely affecting the antenna's performance. Hence, the spacing and orientation of the lands with respect to the ground plane, allows a low profile, high gain antenna, with low directional preference to be implemented.

Figure 6:
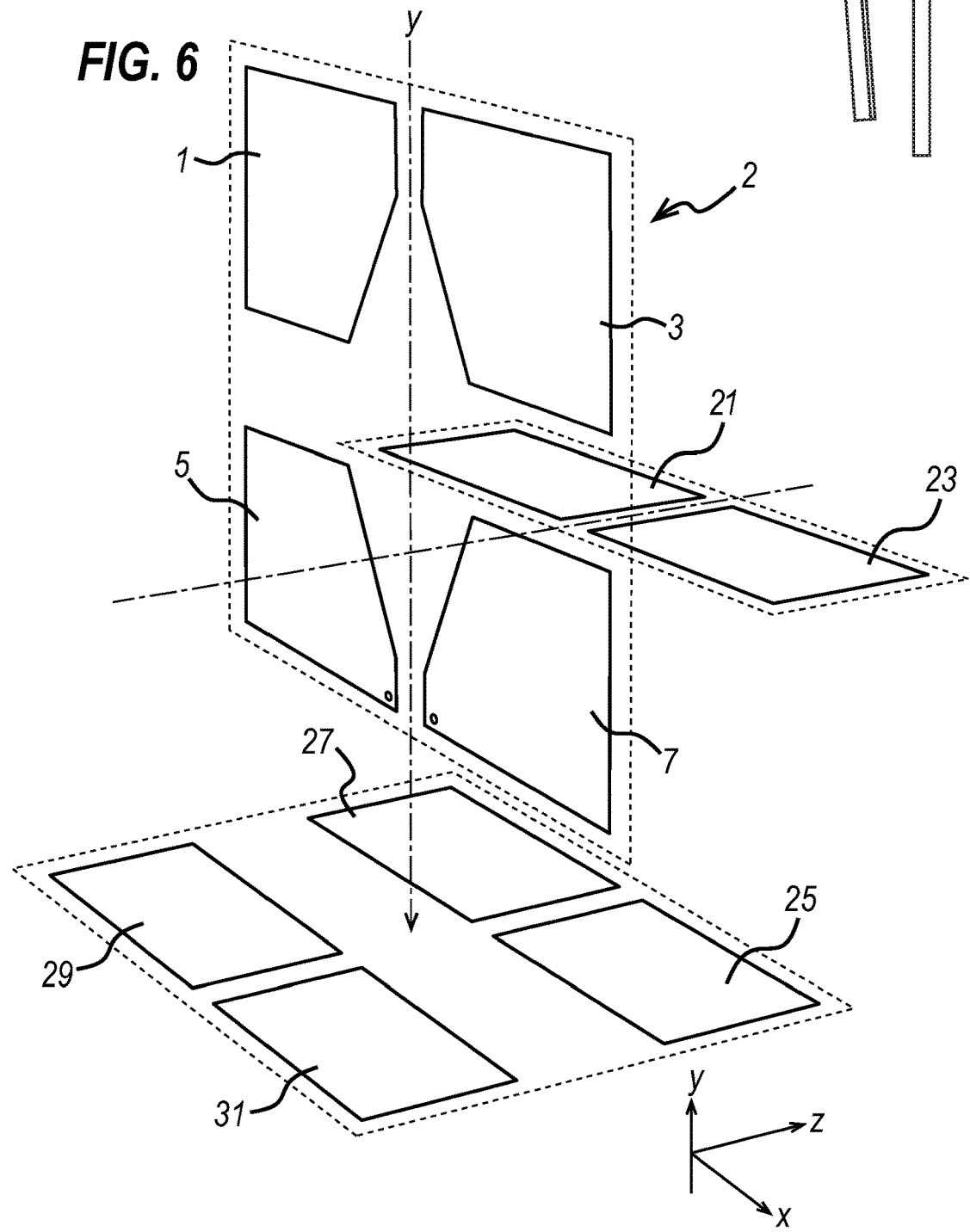
FIG. 6 shows a schematic view of an additional array of lands that can be used to boost performance of the antenna.

As shown in FIG. 6, the antenna 2 can also comprises additional lands 21, 23, 25, 27, 29 and 31 disposed symmetrically about the imaginary line y-y in the XZ plane (i.e. a second plane). Lands 1, 3, 21, 23, 25, 27, 29 and 31 act as parasitic reflectors to lands 5 and 7. Lands 21 and 23 are in the same plane as lands 25, 27, 29 and 31, but spaced apart in the y-y direction.

Lands 21, 23, and 25, 27, 29, 31 may also be formed by laminating aluminium foil lands by hot foil blocking onto respective sheets of stiff cardboard 9. The aluminium foil is approximately $200 \times 10^{-10}$ metres in thickness, which gives an electrical resistance of about 1.5 ohms per square. The foil is overcoated with an electrically-insulating lacquer. The arrangement may be manufactured by sputtering aluminium to the desired thickness onto a lacquer-coated backing surface. The aluminium is then coated with adhesive and the combination hot foil blocked onto the sheet with the adhesive adjacent the sheet. The backing surface is peeled away to leave the sheet, lands 21, 23, and 25, 27, 29, 31 and lacquer overcoating bonded together. Alternatively, (and as explained above) as opposed to using a sheet 9, the lands may be supported by a device in which the antenna is used.

Lands located in the XZ plane can be used to boost the performance of the antenna 2. It will be appreciated that the size of and the number (i.e. greater or fewer than lands 21, 23, 25, 27, 29, 31) in the XZ plane can be varied. They can be similar or different in shape and size to lands 1, 3, 5, and 7 (e.g. substantially square or trapezoidal).

In a further variant of that illustrated, any or all of the land pairs 1 and 3, 21 and 23, 25 and 27, 29 and 31 are merged to form one contiguous land disposed symmetrically about the imaginary line y-y in the XZ plane, to act as parasitic reflectors to lands 5 and 7.

Further shorting non-fed pair(s) of lands can improve band selectivity, and this can be achieved by shorting across a small area of exposed foil on each land.

Changing the planes in which the lands are located with respect to one another varies antenna output. For example, although lands 21, 23, 25, 27, 29, 31 are disposed in the XZ plane, they may also be disposed in the XY plane (either in line with lands 1, 3, 5 and 7, or spaced therefrom in the z-z direction). In these arrangements, the lands 21, 23, 25, 27, 29, 31 would be disposed along the imaginary line, but positioned so that they are symmetrical about the imaginary line y-y.

Antenna 2 is preferably integrated in a consumer electronic device. Such a device with which the antenna can be integrated typically has a display panel, such as an LCD, LED, OLED, AMOLED, plasma, or the like, display panel. The panel of the display is typically electrically conductive and can thus serve as the ground plane 13 of the antenna 2. To further increase the effectiveness of the display panel as the ground plane of the antenna 2, one of the feeds 17 can be electrically coupled to a ground connection of an electronic system of the consumer electronic device Typically, the display panel is connected to this same ground connection of the electronic system of the consumer electronic device. Similarly, the skilled person would appreciate that the ground connection of the electronic system can be system ground, signal ground, circuit ground, chassis ground, or equivalent.

A housing of the consumer electronic device can also support the lands 1, 3, 5 and 7, which can be mounted inside or outside the housing, or be embedded therein to achieve any of the desired spacings (e.g. first, second third and fourth variations above) of the lands 1, 3, 5 and 7 from the display panel (ground plane).

In one embodiment, lands 21, 23, and 25, 27, 29, 31 may be integrated with a wall bracket and stand of the consumer electronic device respectively (hence use of either or both of the wall bracket and stand can boost antenna 2 performance). For example, the antenna 2 can be easily integrated in a flat screen television, wherein the display panel of the television serves as the ground plane 13 to lands 1, 3, 5 and 7 which are embedded in a housing of the television. This arrangement allows the television via antenna 2 (owing to its high gain, with low directional preference), to receive data in both 2.4 and 5 GHz bands with little or no dropped packets. When used in conjunction with a wall bracket and/or stand with respective lands, 21, 23, and 25, 27, 29, 31, (or anything else which supports the lands 21, 23, and 25, 27, 29, 31, in positions which boosts the gain of antenna 2) the probability of dropped packets is further reduced.

In principle, antenna 2 can be integrated into any consumer electronics device in accordance with the principles disclosed herein.

Further, an antenna system may be formed using two antennas 2 (i.e. any of the variants disclosed above), wherein the ground plane 13 is common to both antennas. This allows multiple-input and multiple-output, MIMO, implementations to be used.

Although the lands are described as being formed by laminating aluminium foil lands by hot foil blocking onto stiff cardboard, it is possible to use lands in the form of thin electrically conductive materials such as aluminium manufactured to present as foil type lands. In addition the foil type lands can be manufactured from microwave materials by selecting a material with the appropriate properties such as dielectric constant, thickness and conductor type. Hence, use of the word foil is used to mean both lands formed from a foil and lands formed in other ways which present similarly in the form of foil type elements. Lands of these types may also be integrated with a television, television wall bracket and/or television stand. The structure of these lands makes it practical to deploy the elements internally and/or externally on the television, television wall bracket and/or television stand.

It will be appreciated that this description is by way of example only; alterations and modifications may be made to the described embodiment without departing from the scope of the invention as defined in the claims.

I claim:

1. An antenna comprising:
a pair of electrically conducting lands disposed in a first plane;
antenna feed means for each land of the at least one pair of electrically conducting lands, the pair of lands being symmetric about, and spaced-apart from an imaginary line on the first plane;
at least one spaced-apart electrically conducting land, disposed in said first plane, the at least one land being spaced-apart from the first pair of lands along said imaginary line, being electrically-insulated from the first pair of lands, and being symmetric about said imaginary line; and
a ground plane oriented in a plane, wherein the ground plane is spaced apart from the lands by a value from about ¼₄λ to ⅙λ, when said plane is parallel, wherein the ground plane is spaced apart from the lands by about ⅙λ or ¼₄λ at one end and about ¹⁄₁₂λ at the opposite end, when said plane is angled with respect to the first plane and spaced apart from the first plane, and wherein λ is the wavelength of a frequency of operation of the antenna.

2. The antenna of claim 1, when the ground plane is oriented in a substantially parallel plane, wherein the ground plane is spaced apart from the lands by one of a group consisting of: about ¹⁄₁₂λ, about ¹⁄₂₄λ, and about ⅙λ.

3. The antenna of claim 1, wherein λ is the wavelength of a first frequency of operation of the antenna, and the antenna is configured for a dual-band operation, the dual-band comprising the first frequency of operation, and a second frequency of operation, wherein the second frequency of operation is about twice the first frequency of operation.

4. The antenna of claim 1, wherein each land of the first and second pairs of electrically conducting lands is the same size.

5. The antenna of claim 3, wherein each land of the first and second pairs of electrically conducting lands is the same size, and wherein each land of the first and second pairs of electrically conducting lands is of a size and a spacing with respect to the other lands so as to permit resonance at the first and second frequencies of operation.

6. The antenna of claim 1, wherein the ground plane is spaced apart from the lands by an insulator.

7. The antenna of claim 1, further comprising at least one third electrically conducting land or pair of lands disposed in a second plane and electrically insulated from the first and second pairs of electrically conducting lands, the third pair of lands or third single land being symmetric about the imaginary line.

8. The antenna of claim 7, wherein the first and second planes are substantially orthogonal.

9. The antenna of claim 8, further comprising at least one fourth electrically conducting land or pair of lands in the second plane, the at least one fourth land or pair of lands being spaced apart from the at least one third electrically conducting land or pair of lands, and being electrically insulated from the at least one third electrically conducting land or pair of lands and being symmetric about the imaginary line.

10. The antenna of claim 1, wherein each land is generally rectangular or trapezoidal.

11. The antenna of claim 1, wherein the ground plane comprises an electrically conducting panel.

12. The antenna of claim 11, wherein the panel is a cover of an LCD, LED, OLED, AMOLED, plasma, or the like, display panel.

13. The antenna of claim 12, wherein the display panel is mounted within an electronic device and the first and second lands are mounted on a housing of the electronic device.

14. The antenna of claim 13 wherein the first and second lands are mounted inside or outside the housing, or embedded therein.

15. The antenna of claim 13, wherein the ground plane is connected to a ground of an electronic system of the electrical device.

16. The antenna according to claim 15, wherein the at least one third electrically conductive land or third pair of lands is disposed in or on a wall mount of the electronic device or in or on a stand of the electronic device.

17. The antenna according to claim 15, wherein the at least one fourth electrically conductive land or fourth pair of lands is disposed in or on a wall mount of the electronic device in or on a stand of the electronic device.

18. The antenna according to claim 15, wherein the at least one third electrically conductive land or third pair of lands is disposed in or on a wall mount of the electronic device and the at least one fourth electrically conductive land or fourth pair of lands are disposed in or on a stand of the electronic device.

19. The antenna of claim 12, wherein the electronic device comprises one of: a television, a monitor, a mobile telephone, a smartphone, a tablet computer, a laptop, a personal computer, a portable games consoles, a smartwatch, a set top box, a smart printer, and a smart device.

20. An antenna system, the system comprising;
the antenna of claim 1; and
another antenna, wherein the ground plane is common to both antennas.

* * * * *